US012762234B2

(12) United States Patent
Kim et al.

(10) Patent No.: US 12,762,234 B2
(45) Date of Patent: Oct. 13, 2026

(54) DEVICE, SYSTEM, METHOD, AND COMPUTER PROGRAM FOR INFERRING ATTACKER GROUP

(71) Applicant: S2W INC., Seongnam-si (KR)

(72) Inventors: Jae Ki Kim, Changwon-si (KR); Hyung Suk Kim, Seongnam-si (KR); Seung Hoe Kim, Seongnam-si (KR)

(73) Assignee: S2W INC., Seongnam-si (KR)

( * ) Notice: Subject to any disclaimer, the term of this patent is extended or adjusted under 35 U.S.C. 154(b) by 48 days.

(21) Appl. No.: 18/961,974

(22) Filed: Nov. 27, 2024

(65) Prior Publication Data

US 2026/0080059 A1 Mar. 19, 2026

(30) Foreign Application Priority Data

Sep. 13, 2024 (KR) ........................ 10-2024-0125264

(51) Int. Cl.
*G06F 21/56* (2013.01)
*H04L 9/40* (2022.01)

(52) U.S. Cl.
CPC ........ *G06F 21/565* (2013.01); *H04L 63/1416* (2013.01)

(58) Field of Classification Search
None
See application file for complete search history.

(56) References Cited

U.S. PATENT DOCUMENTS

2015/0096024 A1* 4/2015 Haq .................... H04L 63/1416 726/23
2020/0012647 A1* 1/2020 Johnson, III .......... G06F 16/221

FOREIGN PATENT DOCUMENTS

KR 10-2019-0001039 A 1/2019
KR 10-2424014 B1 7/2022
KR 10-2024-0021677 A 2/2024

OTHER PUBLICATIONS

Communication dated Dec. 27, 2024 in Korean Application No. 10-2024-0125264.

* cited by examiner

*Primary Examiner* — Syed A Roni
(74) *Attorney, Agent, or Firm* — USX IP LLC

(57) ABSTRACT

Provided are a device, system, method, and computer program for inferring an attacker group by analyzing malicious code. The system includes a sandbox pool manager configured to allocate analysis target files for inferring an attacker group to one or more nodes and separately execute the analysis target files in separate malicious code analysis environments by controlling each node, an event manager configured to determine in real time whether all events related to the analysis target files have been collected on the basis of running state information of each node and collect events which are recorded in the malicious code analysis environments of each of the nodes and related to the analysis target files, an attacker group inference part configured to infer an attacker group by analyzing the collected events, and an analysis result provider configured to provide information on the inferred attacker group.

10 Claims, 6 Drawing Sheets

DEVICE, SYSTEM, METHOD, AND COMPUTER PROGRAM FOR INFERRING ATTACKER GROUP

CROSS-REFERENCE TO RELATED APPLICATION

This application claims priority to and the benefit of Korean Patent Application No. 2024-0125264, filed on Sep. 13, 2024, the disclosure of which is incorporated herein by reference in its entirety.

BACKGROUND

1. Field of the Invention

The present disclosure relates to an automatic malicious code analysis device, system and method for inferring an attacker group. More specifically, the present disclosure relates to a device, system and method for running an execution file or a setting file including malicious code or the like in one or more malicious code analysis environments and analyzing a pattern of events (a log file or the like) collected and recorded as results of running the execution file or setting file to infer an attacker group.

2. Discussion of Related Art

With the development of the Internet and network technologies, network security is becoming increasingly important. In particular, since all information is stored on computers and computing environments are becoming more diverse and complex, it is urgent to protect information on computers. When unauthorized and illegal users access an internal communication network, they can interfere with internal computer resources or illegally leak important information to the outside world, which is becoming more damaging and is developing more diverse methods due to the development of networks.

Technological advances in cybersecurity have increased the importance of intrusion detection systems (IDSs) for detecting attacking traffic. To develop these IDSs, various machine learning technologies are being incorporated. In particular, it is becoming more important to establish active security-incident response rules (sigma rules) for actively responding to a security incident by inferring an attacker group who launches a cyberattack in a short time and rapidly identifying a similar pattern.

In this regard, there is Korean Patent Registration No. 10-2671718 (May 29, 2024).

SUMMARY OF THE DISCLOSURE

The present disclosure is directed to providing an automatic malicious code system and method for inferring an attacker group.

Objects of the present disclosure are not limited to that described above, and other objects which have not been described will be clearly understood by those skilled in the technical field to which the present disclosure pertains from this specification and the accompanying drawings.

According to an aspect of the present disclosure, there is provided a system for inferring an attacker group by analyzing malicious code, the system including an analysis target acquisition part configured to acquire analysis target files for inferring an attacker group, a sandbox pool manager configured to allocate the analysis target files to one or more nodes and separately execute the analysis target files in malicious code analysis environments implemented in each of the nodes by controlling the one or more nodes, an event manager configured to determine in real time whether all events related to the analysis target files have been collected on the basis of running state information of each of the nodes and collect events which are recorded in the malicious code analysis environments of each of the nodes and related to the analysis target files, an attacker group inference part configured to infer an attacker group by analyzing the collected events, and an analysis result provider configured to provide information on the inferred attacker group.

The system may further include a sigma rule storage configured to store a plurality of sigma rules, which represent patterns of attack events of each of attacker groups.

The attacker group inference part may infer the attacker group on the basis of similarity information derived by comparing the collected events with each of the plurality of sigma rules.

The sigma rules may comprise one or more predefined attack patters, and the one or more predefined attack patterns are data consisting of a combination of an order of process generation events, an order of file creation or removal, and information on an action chain.

The sandbox pool manager may allocate a file group including one or more files dependent on each other among the analysis target files to a first node, control the first node to execute the one or more files in a first malicious code analysis environment implemented in the first node, and collect events, which are collected by a system monitoring part run by the first node and recorded in the first malicious code analysis environment.

The sandbox pool manager may allocate a first execution file among the analysis target files and one or more dynamic libraries or temporary files that are referred to by the first execution file to the first node.

Until running of the first malicious code analysis environment is finished, the sandbox pool manager may collect events including instructions executed by the first execution file or logs recorded by the first execution file, events related to one or more registries manipulated by the first execution file, and instructions periodically or simultaneously performed by the one or more manipulated registries.

On the basis of a manager's scale-out setting, the sandbox pool manager may allocate a plurality of file groups to the first node and control the first node to simultaneously execute all files in the plurality of file groups.

The attacker group inference part may include an artificial intelligence model that receives the collected events and infers the attacker group, and the artificial intelligence model may be a neural network model that is trained using the plurality of sigma rules stored in the sigma rule storage.

Solutions of the present disclosure are not limited to those described above, and other solutions which have not been described will be clearly understood by those skilled in the technical field to which the present disclosure pertains from this specification and the accompanying drawings.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings.

DETAILED DESCRIPTION OF EXEMPLARY EMBODIMENTS

Figure 1:
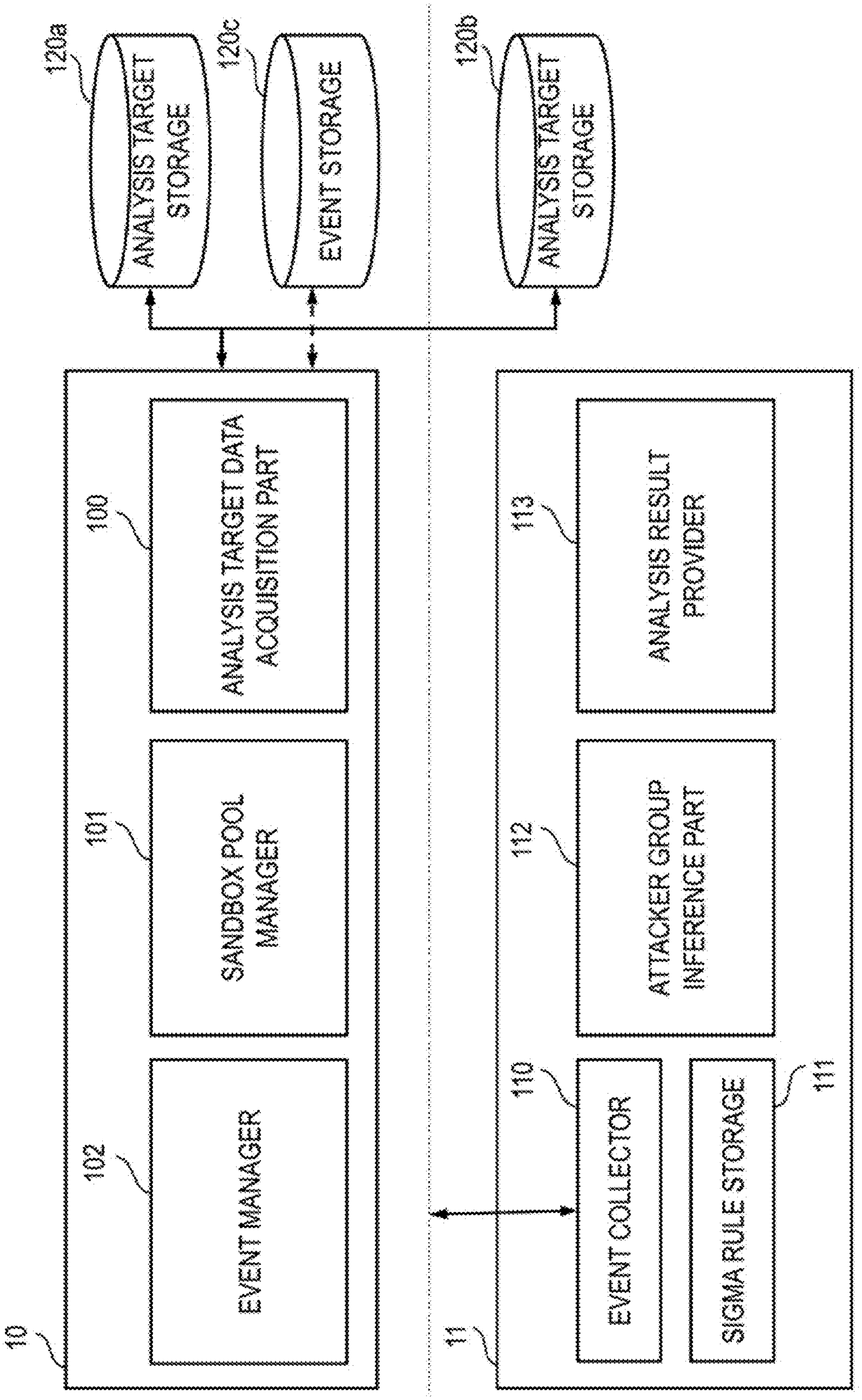
FIG. 1 is a diagram illustrating a structure of a system for inferring an attacker group according to exemplary embodiments (hereinafter, "system according to exemplary embodiments").

The present disclosure can be diversely modified and have various embodiments, and specific embodiments will be illustrated in the drawings and described in detail below. However, this is not intended to limit the present disclosure to specific embodiments, and it should be understood that the present disclosure includes all modifications, equivalents, and substitutions within the spirit and technical scope of the present disclosure. Throughout the drawings, like reference numerals refer to like components.

Terms such as "first," "second," "A," "B," and the like may be used to describe various components, but components are not limited by these terms. The terms are used only for the purpose of distinguishing one component from others. For example, without departing from the scope of the present disclosure, a first component may be named a second component, and similarly, a second component may be named a first component. The term "and/or" includes combinations of a plurality of stated relevant items or any one of the plurality of state relevant items.

When a component is referred to as being "connected" or "coupled" to another component, the two components may be directly connected or coupled to each other, or still another component may be interposed therebetween. On the other hand, when a component is referred to as being "directly connected" or "directly coupled" to another component, there is no other component therebetween.

Terminology used herein is only for the purpose of describing specific embodiments and is not intended to limit the present disclosure. Singular expressions include the plural expressions unless the context clearly indicates otherwise. In this specification, the terms "include," "have," and the like indicate the presence of described features, integers, steps, operations, components, parts, or combinations thereof and do not preclude the presence or addition of one or more other features, integers, steps, operations, components, parts, or combinations thereof.

Unless otherwise defined, all terms including technical or scientific terms used herein have the same meanings as generally understood by those of ordinary skill in the art. Terms defined in commonly used dictionaries should be construed as having meanings consistent with their meanings in the context of the related art and should not be construed as having an idealized or overly formal sense unless expressly defined in this specification.

The present disclosure relates to a system for automatically analyzing malicious code (which may be defined as analysis target files hereinafter) to infer an attacker group. Specifically, the present disclosure relates to a system for inferring, when a security incident occurs, an attacker group on the basis of malicious code (i.e., an analysis target file or the like in the present disclosure) or an action chain that is the cause of the security incident. Inferring an attacker group may be, for example, a process of inferring which attacker group has attacked, where the origin of malicious code is, and similarity with security incidents in the past on the basis of an action pattern and action chains of a security incident, instructions or system calls performed on an operating system (OS), and the like.

A system according to exemplary embodiments acquires malicious code (i.e., analysis target files) related to occurrence of a security incident and executes the malicious code in a sandbox environment (i.e., an isolated OS environment or an isolated malicious code analysis environment). A system according to exemplary embodiments provides a safe malicious code analysis environment by managing a sandbox pool, which runs one or more sandbox guests (also referred to as sandbox nodes), and executes malicious code to monitor actions of the malicious code. A system according to exemplary embodiments analyzes abnormal actions and an invasive pattern of malicious code by comparing system events and logs caused by the malicious code or the like with prestored sigma rules and infers an attacker group.

Hereinafter, operations of a system according to exemplary embodiments will be described in detail with reference to FIGS. 1 to 5 below.

FIG. 1 is a diagram illustrating a structure of a system for inferring an attacker group according to exemplary embodiments (hereinafter, "system according to exemplary embodiments").

Specifically, FIG. 1 shows detailed components and operations of a system for analyzing malicious code (analysis target files or the like) to infer an attacker group. The system according to exemplary embodiments includes an external server 10 including an analysis target data acquisition part 100, a sandbox pool manager 101, and an event manager 102 and an internal server 11 including an event collector 110, a sigma rule storage 111, an attacker group inference part 112, and an analysis result provider 113.

The external server 10 may be a distributed external server and a server that runs a sandbox pool platform. The external server 10 acquires analysis target files, executes the analysis target files in separate malicious code analysis environments, and collects and sorts events and logs acquired from each of the malicious code analysis environments.

Meanwhile, the term "malicious code analysis environment" described herein may include a virtual machine, a bare metal server, an emulator, and the like that run an OS and the like in a separate environment.

The external server 10 loads analysis target files stored in analysis target storages 120*a* and 120*b* and separately executes the analysis target files in one or more malicious code analysis environments. The external server 10 may store events and logs collected from the one or more malicious code analysis environments in an event storage 120*c*.

The external server 10 includes the analysis target data acquisition part 100, the sandbox pool manager 101, and the event manager 102.

The data acquisition part 100 acquires analysis target files to be analyzed in security incident analysis, that is, dynamic library files, temporary files, execution files, and auxiliary files.

The sandbox pool manager 101 manages a sandbox pool. The sandbox pool manager 101 generates or deletes one or more sandbox nodes and manages each sandbox node. One sandbox node runs one or more malicious code analysis environments. In other words, a sandbox node may be an instance for running one or more malicious code analysis environments and also an entity that detects malicious code in an analysis target file, manages the progress of the execution, and performs resource management and the like on the OS of a malicious code analysis environment which is run by the node. The sandbox pool manager 101 may allocate analysis target files to one or more sandbox nodes and performs control to run a malicious code analysis environment of each sandbox node. In other words, the sandbox pool manager 101 manages a plurality of malicious code analysis environments to run analysis target files in the same malicious code analysis environment or different malicious code analysis environments. Here, each node is configured not to affect other systems by independently executing malicious code.

Meanwhile, the sandbox pool manager 101 may classify execution files and/or dynamic libraries that are dependent on each other among analysis target files into one group, allocate the execution files and/or dynamic libraries to the same node (i.e., the same malicious code analysis environment), and execute the execution files and/or dynamic libraries in the same node. For example, the system according to exemplary embodiments may allocate a first execution file among the analysis target files and one or more dynamic libraries or temporary files that are referred to by the first execution file to a first node.

Here, the sandbox pool manager 101 may allocate one group (i.e., the first execution file and the one or more dynamic libraries or temporary files that are referred to by the first execution file) to one node or allocate two or more groups to one node. Also, the sandbox pool manager 101 may copy one group and allocate the same group to two or more nodes.

The event manager 102 monitors each sandbox node in real time to collect logs and events that are recorded in a malicious code analysis environment run by the sandbox node.

Meanwhile, to ensure the independent running environment of each sandbox node, the event manager 102 does not collect events when the OS of a malicious code analysis environment executes or refers to some or all of analysis target files. The event manager 102 starts collecting recorded events and logs when the OS of a malicious code analysis environment neither executes nor refers to analysis target files.

In other words, the event manager 102 receives, in real time, running state information of each node in the sandbox pool manager 101, that is, information generated from the sandbox pool and representing the states of analysis a malicious code analysis environment. The information representing the states of analysis the malicious code analysis environment may include, for example, a pending state, a running state, and a completed state of the malicious code analysis environment, a reported state in which events and logs recorded in a malicious code analysis environment are collected and transmitted to the event storage 120*c* after the malicious code analysis environment is completed, and the like. When the running state information of a first malicious code analysis environment of the first node is the completed state, the event manager 102 controls the first node to start collecting events and logs recorded in the first malicious code analysis environment.

At this time, the event manager 102 and/or the event storage 120*c* collects events and/or logs, that is, events of actions that generate target samples in a malicious code analysis environment (e.g., process generation, file generation, registry modification and generation, network events, and the like), from each node as described above. When the event manager 102 and/or the event storage 120*c* collects all such events and/or logs, running state information of the corresponding node is switched to the completed state or the reported state.

Events and/or logs collected by the event manager 102 may include global events generated in each malicious code analysis environment. In other words, the event manager 102 collects not only events directly related to an analysis target file but also system configuration files (e.g., registry values, system-dynamic libraries, and the like) written or modified due to execution of the analysis target file and instructions (system calls and the like) indirectly executed by the written or modified system configuration files.

The event manager 102 monitors the running states of each of the nodes to determine whether all events and/or logs related to analysis target files are collected. When all events and/or logs related to analysis target files are collected, the collected events and/or logs may be sorted in time order or structured into data. For example, when all events and/or logs are collected from all the nodes, the event manager 102 may sort and structure the collected events and/or logs to generate a security incident action chain for an analysis target file. Also, the event manager 102 may store events, which are recorded in a malicious code analysis environment of each node, in the event storage 120*c*.

The event storage 120*c* and/or the event manager 102 according to exemplary embodiments collects all instructions executed by a specific execution file in the group or all logs recorded by the specific execution file from the time when a specific malicious code analysis environment runs until the running of the specific malicious code analysis environment ends. In addition, the sandbox pool manager 101 and/or the event manager 102 according to exemplary embodiments may further collect events related to one or more registries manipulated by the corresponding execution file, and events including instructions periodically or simultaneously performed by the one or more manipulated registries. With this configuration, the sandbox pool manager 101 and/or the event manager 102 according to exemplary embodiments allows analysis of not only direct instructions and damage caused by malicious code but also indirect influence on an entire system and side effects on the entire system.

Figure 2:
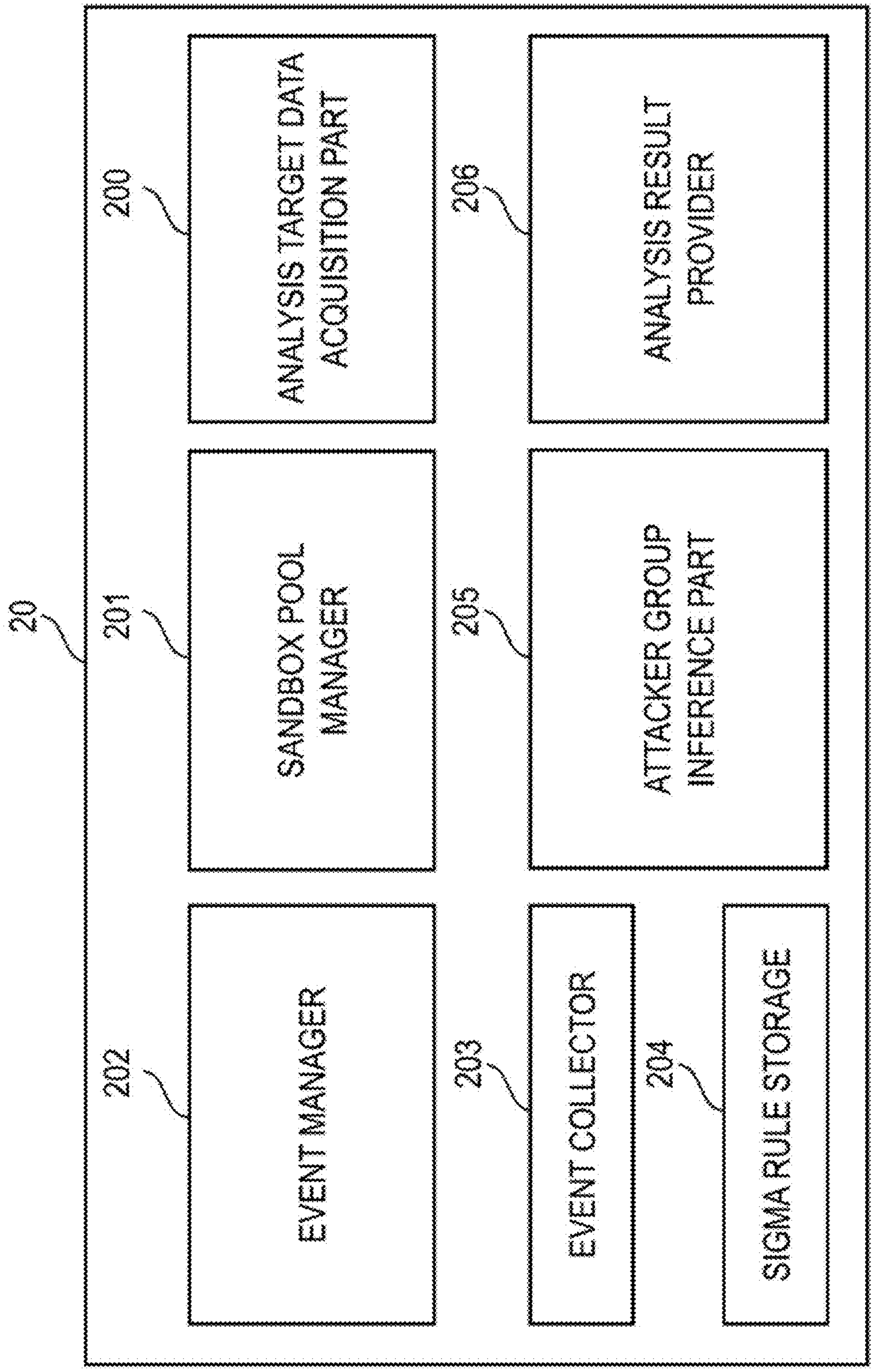
FIG. 2 is a diagram illustrating another structure of the system according to exemplary embodiments.

The internal server 11 may be directly managed by a manager and is a server that loads collected events and logs from the external server 10 to analyze the events and logs and reports analysis results to the manager. The internal server 11 includes the event collector 110, the sigma rule storage 111, the attacker group inference part 112, and/or the analysis result provider 113. Meanwhile, the sandbox pool manager 101 according to exemplary embodiments may be included in the external server 10 as shown in FIG. 1 or may be included in the internal server 11 as shown in FIG. 2.

The event collector 110 collects all events and logs of all the nodes collected by the event manager 102 and/or the event storage 120*c*. Meanwhile, in FIG. 1, the event collector 110 of the internal server 11 checks the event manager 102 of the external server 10 in real time. In other words, the event collector 110 determines whether events and logs of all the nodes are collected and sorted by the event manager 102 in real time, and when it is determined that the events and logs are collected and sorted, collects the sorted events and logs.

The event collector 110 collects all the events and logs of all the nodes collected by the event manager 102 and/or the event storage 120*c* and compares the events and logs with sigma rules stored in the sigma rule storage 111. The sigma rules represent attack event patterns defined for each of various attacker groups.

Meanwhile, the sigma rules may represent one or more attack patterns that are defined in advance by, for example, the manager or the like. The one or more attack patterns may be data consisting of a combination of the order of process generation events, the order of file creation or removal, information on an action chain, and the like. The sigma rules may be a set of logical conditions based on rules that are designed to indicate a predefined specific attacker group under a specific condition. The sigma rules are a set of conditions that are designed to indicate a specific attacker group, for example, when a specific action chain occurs in a specific time order and thus a specific file is generated or deleted within a specific time.

The attacker group inference part 112 calculates and analyzes similarities between the collected events and the sigma rules to infer an attacker group that has created the corresponding analysis target file or caused a security incident.

At this time, the attacker group inference part 112 may match and compare the plurality of sigma rules stored in the sigma rule storage 111 with the collected events and logs on a one-to-one basis to derive the similarities. Also, the attacker group inference part 112 may include an artificial intelligence model that receives the collected events and infers the attacker group. The artificial intelligence model may be a neural network model that has been trained using the plurality of sigma rules stored in the sigma rule storage 111 as training data.

In this case, the attacker group inference part 112 according to exemplary embodiments may structure the collected events and logs to process the events and logs into data suitable for input to the artificial intelligence model. For example, the attacker group inference part 112 according to exemplary embodiments may refine and/or standardize the collected events and logs to generate action chain data in the form of a graph structure. The action chain data may be, for example, data that represents the time order and topological order of predefined regular events as graph nodes and graph edges. The attacker group inference part 112 according to exemplary embodiments may generate the action chain data as described above and input the action chain data to the artificial intelligence model to obtain an attacker group as an output.

The artificial intelligence model according to exemplary embodiments may be a neural network model that has learned training data based on information about past security incidents. The training data may include one or more indicators of compromise (IOCs) including relationships between events and attributes of the events and may have attacker group information corresponding thereto as label information.

The training data may be obtained by processing the information about past security incidents in accordance with the structure of the action chain data. For example, the training data may be obtained by structuring events and logs of the past security incidents in time order and topological order. Also, the training data may further include data obtained by augmenting the events and logs sorted in time order and topological order with replaceable events and replaceable logs.

The analysis result provider 113 provides information about the attacker group that is inferred as described above to a user. The analysis result provider 113 may visualize information about the inferred attacker group and provide the visualized information, and may refer to data stored in the analysis result storage 120*b* as necessary.

In addition to the information about the attacker group, the analysis result provider 113 according to exemplary embodiments may further provide network action log information (pcap), network action diagnosis result information (suricata), static analysis log files (hash, strings), static analysis diagnosis results (yara), dynamic analysis log files (report.json, api calls, and the like), dynamic analysis diagnosis results (sigma rules), unique technology identifications (IDs) for threatening actions (TTP), execution result screen capture information, and the like.

With this configuration, the system according to exemplary embodiments can accurately determine a detailed action chain of a security incident and the cause of the incident by executing and analyzing malicious code in separate malicious code analysis environments.

With this configuration, the system according to exemplary embodiments can increase the completeness of a step-by-step automation test of an entire integrated system.

FIG. 2 is a diagram illustrating another structure of the system according to exemplary embodiments.

Specifically, FIG. 2 shows an exemplary embodiment in which the external server 10 and the internal server 11 are not divided but integrated into one server 20, that is, a device (integrated server or the like) according to exemplary embodiments, unlike FIG. 1.

The integrated server 20 according to exemplary embodiments includes an analysis target data acquisition part 200, a sandbox pool manager 201, an event manager 202, an event collector 203, a sigma rule storage 204, an attacker group inference part 205, and an analysis result provider 206.

The analysis target data acquisition part 200 collects analysis target files to infer an attacker group of malicious code. The analysis target data acquisition part 200 performs some or all of the operations of the analysis target data acquisition part 100 of FIG. 1. In other words, analysis target files according to exemplary embodiments may include dynamic library files, temporary files, execution files, auxiliary files, and the like. The analysis target files according to exemplary embodiments are managed by the sandbox pool manager 201.

The sandbox pool manager 201 manages a sandbox pool, generates or deletes one or more sandbox nodes, and controls each sandbox node. The sandbox pool manager 201 performs some or all of the operations of the sandbox pool manager 101 of FIG. 1. In other words, the sandbox pool manager 201 manages one or more sandbox nodes, and one sandbox node runs one or more malicious code analysis environments. In one malicious code analysis environment, some or all malicious code (analysis target files) is separately executed and analyzed. The sandbox pool manager 201 divides or groups the analysis target files, allocates the divided or grouped analysis target files to sandbox nodes, and controls each sandbox node such that the allocated files may be executed in malicious code analysis environments run by each of the sandbox nodes. In this way, the sandbox pool manager 201 causes the analysis target files to be separately executed or run on different OSs such that the analysis target files can be analyzed independently in independent environments without affecting other systems or other malicious code analysis environments.

Meanwhile, the sandbox pool manager 201 may classify execution files and/or dynamic libraries that are dependent on each other among the analysis target files into one group, allocate the execution files and/or dynamic libraries to the same node (i.e., the same malicious code analysis environment), and execute the execution files and/or dynamic libraries in the same node. For example, the sandbox pool manager 201 may allocate a first execution file among the analysis target files and one or more dynamic libraries or temporary files that are referred to by the first execution file to a first node.

Here, the sandbox pool manager 201 may allocate one group (i.e., the first execution file and the one or more dynamic libraries or temporary files that are referred to by the first execution file) to one node or allocate two or more groups to one node. Also, the sandbox pool manager 201 may copy one group and allocate the same group to two or more nodes.

Also, on the basis of a scale-out setting of a manager, the sandbox pool manager 201 may allocate a plurality of groups to one node and control the node to simultaneously execute all files in the plurality of file groups. On the other hand, on the basis of a scale-in setting of the manager, the sandbox pool manager 201 may allocate only one group to one node or copy one group and allocate the same group to each of a plurality of nodes, controlling the nodes to simultaneously execute the group.

The event manager 202 monitors the running state of each sandbox node in real time, and in connection with this, causes the event collector 203 to determine whether all events related to the analysis target files are collected. The event collector 203 collects events and logs generated in malicious code analysis environments. Meanwhile, the sandbox pool manager 201 monitors the running state (i.e., the execution of an analysis target file, the completion of executing the analysis target file, the running of a malicious code analysis environment, the end of running the malicious code analysis environment, and the like) of each sandbox node to update the running state information of each sandbox node. Here, the event manager 202 watches the running state information of the sandbox nodes in real time and waits or collects events collected from malicious code analysis environments running in the nodes on the basis of the running state information which is checked in real time.

For example, the event manager 202 checks, in real time, the running state information of a plurality of nodes managed by the sandbox pool manager 201. When the running state of the first node is the "execution of an analysis target file completed" state or the "running of a malicious code analysis environment ended" state, the event manager 202 loads events and logs recorded in the malicious code analysis environment of the first node in time order and sorts the loaded events and logs in time order. Likewise, the event manager 202 loads events and logs of other nodes and sorts the events and logs in time order.

The event manager 202 according to exemplary embodiments collects all instructions executed by a specific execution file in a group or all logs recorded by the specific execution file from the time when a specific malicious code analysis environment runs until the running of the specific malicious code analysis environment ends. In addition, the sandbox pool manager 201 and/or the event manager 202 according to exemplary embodiments may further collect events related to one or more registries manipulated by the corresponding execution file, and events including instructions periodically or simultaneously performed by the one or more manipulated registries. With this configuration, the sandbox pool manager 201 and/or the event manager 202 according to exemplary embodiments allows analysis of not only direct instructions and damage caused by malicious code but also indirect influence on an entire system and side effects on the entire system.

The event collector 203 loads the events and logs collected by the event manager 202 and sorts the events and logs in time order or in an action chain order.

The attacker group inference part 205 compares the collected events and logs with sigma rules stored in the sigma rule storage 204. The attacker group inference part 205 determines whether the collected events correspond to the sigma rules or whether the collected events are similar to the sigma rules. The attacker group inference part 205 may determine whether the collected events correspond to the sigma rules stored in the sigma rule storage 204 or calculate similarities representing how similar the collected events are to the sigma rules, and compare the calculated similarities with a preset threshold to extract candidates for an attacker group. In other words, the attacker group inference part 205 analyzes similarities between the events collected by the event collector 203 and the sigma rules to infer a specific attacker group.

Meanwhile, the attacker group inference part 205 may include an artificial intelligence model that receives the collected events to infer the attacker group, and the artificial intelligence model may be a neural network model that has been trained using the plurality of sigma rules stored in the sigma rule storage 204 as training data.

In this case, the attacker group inference part 205 according to exemplary embodiments may structure the collected events and logs to process the events and logs into data suitable for input to the artificial intelligence model. For example, the attacker group inference part 205 according to exemplary embodiments may refine and/or standardize the collected events and logs to generate action chain data in the form of a graph structure. The action chain data may be, for example, data that represents the time order and topological order of predefined regular events as graph nodes and graph edges. The attacker group inference part 205 according to exemplary embodiments may generate the action chain data as described above and input the action chain data to the artificial intelligence model to obtain an attacker group as an output.

The artificial intelligence model according to exemplary embodiments may be a neural network model that has learned training data based on information about past security incidents. The training data may include one or more IOCs including relationships between events and attributes of the events, and may have attacker group information corresponding thereto as label information.

The training data may be obtained by processing the information about past security incidents in accordance with the structure of the action chain data. For example, the training data may be obtained by structuring events and logs of the past security incidents in time order and topological order. Also, the training data may further include data obtained by augmenting the events and logs sorted in time order and topological order with replaceable events and replaceable logs.

The analysis result provider 206 provides information about the attacker group on the basis of the inference result to a user. The analysis result provider 206 may visualize the result derived by the attacker group inference part 205 and provide the visualized result to the user. In addition to the information about the attacker group, the analysis result provider 206 according to exemplary embodiments may further provide network action log information (pcap), network action diagnosis result information (suricata), static analysis log files (hash, strings), static analysis diagnosis results (yara), dynamic analysis log files (report.json, api calls, and the like), dynamic analysis diagnosis results (sigma rules), unique technology IDs for threatening actions (TTP), execution result screen capture information, and the like.

With this configuration, the system according to exemplary embodiments can effectively perform malicious code analysis and attacker group inference. The system according to exemplary embodiments can accurately determine the cause of a security incident and an attacker group through independent analysis of malicious code and real-time event collection and analysis.

Figure 3:
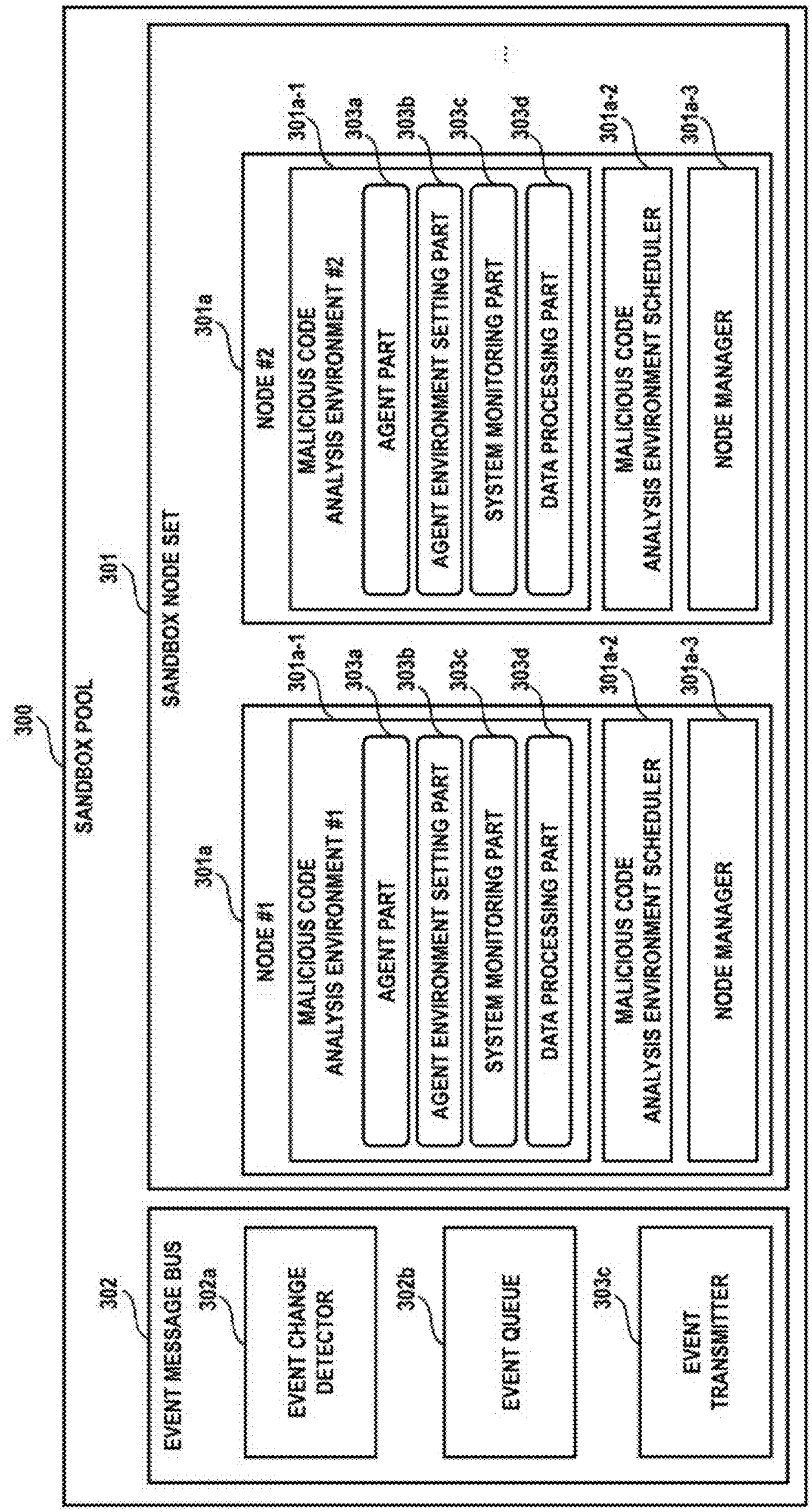
FIG. 3 is a diagram showing a data and instance structure of a sandbox pool managed by a sandbox pool manager according to exemplary embodiments.

FIG. 3 is a diagram showing a data and instance structure of a sandbox pool managed by a sandbox pool manager according to exemplary embodiments.

The data and instance structure of the sandbox pool is the structure of data or instances managed by the sandbox pool manager 101 or 201 of FIG. 1 or 2. The sandbox pool is the structure of data or instances designed to run several malicious code analysis environments, which are independent and separate, and execute malicious code (analysis target files) in each of the separate malicious code analysis environments which have been run. The sandbox pool managers 101 and 201 manage resources of each malicious code analysis environment and collect events and logs recorded or occurring in each malicious code analysis environment.

Specifically, a sandbox pool 300 according to exemplary embodiments includes a sandbox node set 301 and an event message bus 302. The sandbox node set 301 includes multiple nodes 301*a*, and the nodes run several malicious code analysis environments 301*a*-1. Each malicious code analysis environment 301*a*-1 includes an agent part 303*a*, an agent environment setting part 303*b*, a system monitoring part 303*c*, and a data processing part 303*d*.

The agent part 303*a* (agent.py) serves to execute an analysis target file in a sandbox and collect actions of malicious code. For example, the agent part 303*a* executes the analysis target file and collects the analysis file's execution instructions or the analysis target file's access logs and instructions for other files.

The agent environment setting part 303*b* (config_agent.py) handles settings related to debugging or the malicious code analysis environment for analyzing the analysis target file. For example, the agent environment setting part 303*b* adjusts settings of the malicious code analysis environment, network settings, and the like on the basis of a script or a value of a global variable preset by the administrator to optimize an analysis environment.

The system monitoring part 303*c* (Sysmon) monitors events and services that occur in the malicious code analysis environment and collects logs thereof. The system monitoring part 303 may record execution instructions (e.g., a system call, an update of service state information, and the like) of malicious code and occurrence of events.

The data processing part 303*d* serves to process the collected data (execution instructions of malicious code, details of performing events) and transmit the processed data in a storage or analyze the processed data in real time.

A malicious code analysis environment scheduler 301*a*-2 (e.g., CAPEv2 or the like) controls the malicious code analysis environment 301*a*-1, which is run in the corresponding node, and extracts and analyzes the payload and components of data, which is communicated inside or outside the system by the malicious code.

A node manager 301*a*-3 manages system resources of the corresponding node, processes an analysis request, and interacts with the sandbox pool 300.

An event change detector 302*a* records and collects states of analysis (pending, running, completed, and reported) and the like of malicious code analysis environments and stores the states of analysis in an event queue 302*b* in time order. In connection with this, the event queue 302*b* checks, in real time, events and log records related to analysis target files, which are run in sandboxes, and collects and stores the events and log records in time order. An event transmitter 302*c* acquires the events stored in the event queue 302*b* in accordance with a call of an event collector (110 of FIGS. 1 and/or 203 of FIG. 2) and the like.

Meanwhile, the system according to exemplary embodiments may classify execution files and/or dynamic libraries that are dependent on each other among the analysis target files into one group, allocate the execution files and/or dynamic libraries to the same node (i.e., the same malicious code analysis environment), and execute the execution files and/or dynamic libraries in the same node. For example, the system according to exemplary embodiments may allocate a first execution file among the analysis target files and one or more dynamic libraries or temporary files that are referred to by the first execution file to a first node.

Here, the system according to exemplary embodiments may allocate one group (i.e., the first execution file and the one or more dynamic libraries or temporary files that are referred to by the first execution file) to one node or allocate two or more groups to one node. Also, the system according to exemplary embodiments may copy one group and allocate the same group to two or more nodes.

Figure 4:
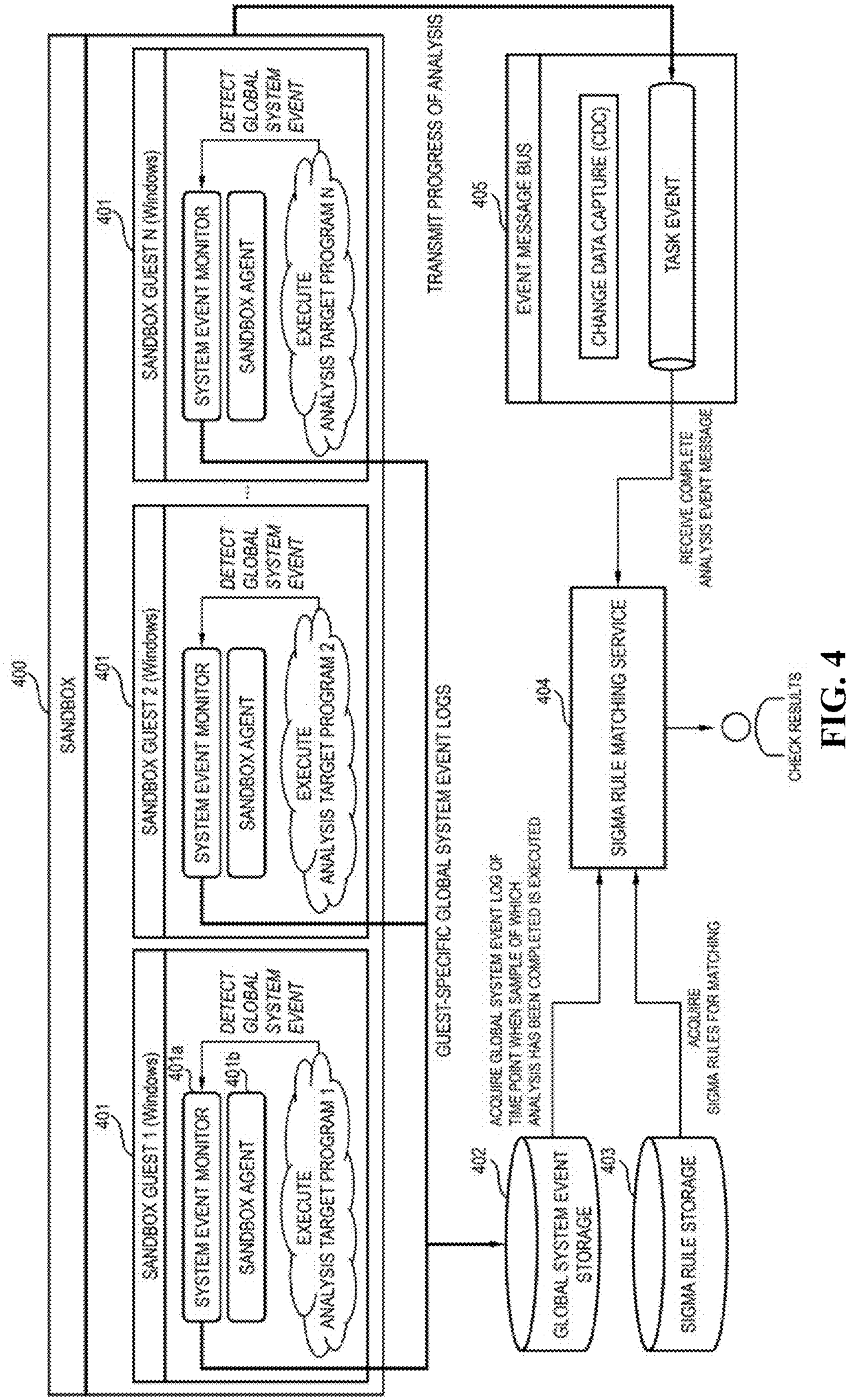
FIG. 4 is a diagram illustrating a process in which a system according to exemplary embodiments infers an attacker group using a sandbox pool and a sandbox pool application programming interface (API).

FIG. 4 is a diagram illustrating a process in which a system according to exemplary embodiments infers an attacker group using a sandbox pool and a sandbox pool application programming interface (API).

Specifically, FIG. 4 illustrates operations in which the system according to exemplary embodiments manages nodes according to exemplary embodiments. The system according to exemplary embodiments includes a node 400 which is identical to the foregoing sandbox nodes, a global system event storage 402, a sigma rule storage 403, a sigma rule matching service part 404, and an event message bus 405.

The node 400 according to exemplary embodiments is run in the system according to exemplary embodiments and runs multiple sandbox guests 401.

Each sandbox guest 401 independently operates in a malicious code analysis environment and executes one or more analysis target files. Each sandbox guest 401 includes a system event monitor 401*a* and a sandbox agent 401*b*. The system event monitor 401*a* monitors events, instructions, inputs/outputs (I/Os), reads/writes, system calls, references to and changes of registries, and the like occurring in each malicious code analysis environment in real time and collects logs thereof. The sandbox agent 401*b* is run in the malicious code analysis environment, executes analysis target files, and manages the node 400 to record events, logs, and the like generated by executing the analysis target files (analysis target programs) through the system event monitor 401*a*.

The node 400 according to exemplary embodiments runs the plurality of sandbox guests 401. The system according to exemplary embodiments of FIG. 4 runs N sandbox guests 401, and analysis target files are distributed or allocated to the N sandbox guests 401 and separately executed.

The system according to exemplary embodiments collects all events, logs, and registry value change histories, that is, global system events, occurring in each sandbox guest 401 and stores the collected global system events in the global system event storage 402. The global system event storage 402 stores all system events and logs from the time points when the analysis target files are executed (or the time point when the running of an initial malicious code analysis environment starts) until the time point when the analysis target files end (or the time point when the running of a last malicious code analysis environment ends).

The sigma rule storage 403 stores sigma rules defined for each of attacker groups. The sigma rules according to exemplary embodiments are a set of rules that define attack patterns, that is, rules for attack patterns utilized to detect and analyze malicious actions of a specific attacker group by comparing the collected system events and logs therewith.

The sigma rule matching service part 404 compares the collected system events and logs with the sigma rules stored in the sigma rule storage 403 to extract one or more sigma rules that match the system events and logs or are highly similar to the system events and logs. In other words, the sigma rule matching service part 404 applies the collected system events and logs to all the sigma rules to derive similarity values with each of the sigma rules. When a sigma rule has a high similarity value (e.g., a specific threshold or more), an entity corresponding to the sigma rule is inferred as an attacker group.

Meanwhile, the event message bus 405 includes a change data capture (CDC) module for monitoring state information of each sandbox guest 401, and monitors state information of each sandbox guest 401. The CDC module checks that each sandbox guest is in the "end of analysis" state, and the global system event storage 402 according to exemplary embodiments collects global events and logs generated by the analysis target files. Specifically, the CDC module checks that each sandbox guest is in the "end of analysis" state, and then the event message bus 405 receives the events and logs and temporarily stores the events and logs in a task event queue. Subsequently, when it is determined by the CDC module that the running of all sandbox guests is completed, the sigma rule matching service part 404 according to exemplary embodiments acquires the global events and logs stored in the global system event storage 402.

With this configuration, the system according to exemplary embodiments effectively performs malicious code analysis and attacker group inference. The system according to exemplary embodiments can accurately identify the cause of a security incident and an attacker group through independent analysis of malicious code and real-time event collection and analysis.

With this configuration, the system according to exemplary embodiments can increase the completeness of a step-by-step automation test of an entire integrated system.

With this configuration, the system according to exemplary embodiments allows analysis of not only direct instructions and damage caused by malicious code but also indirect influence on an entire system and side effects on the entire system.

Figure 5:
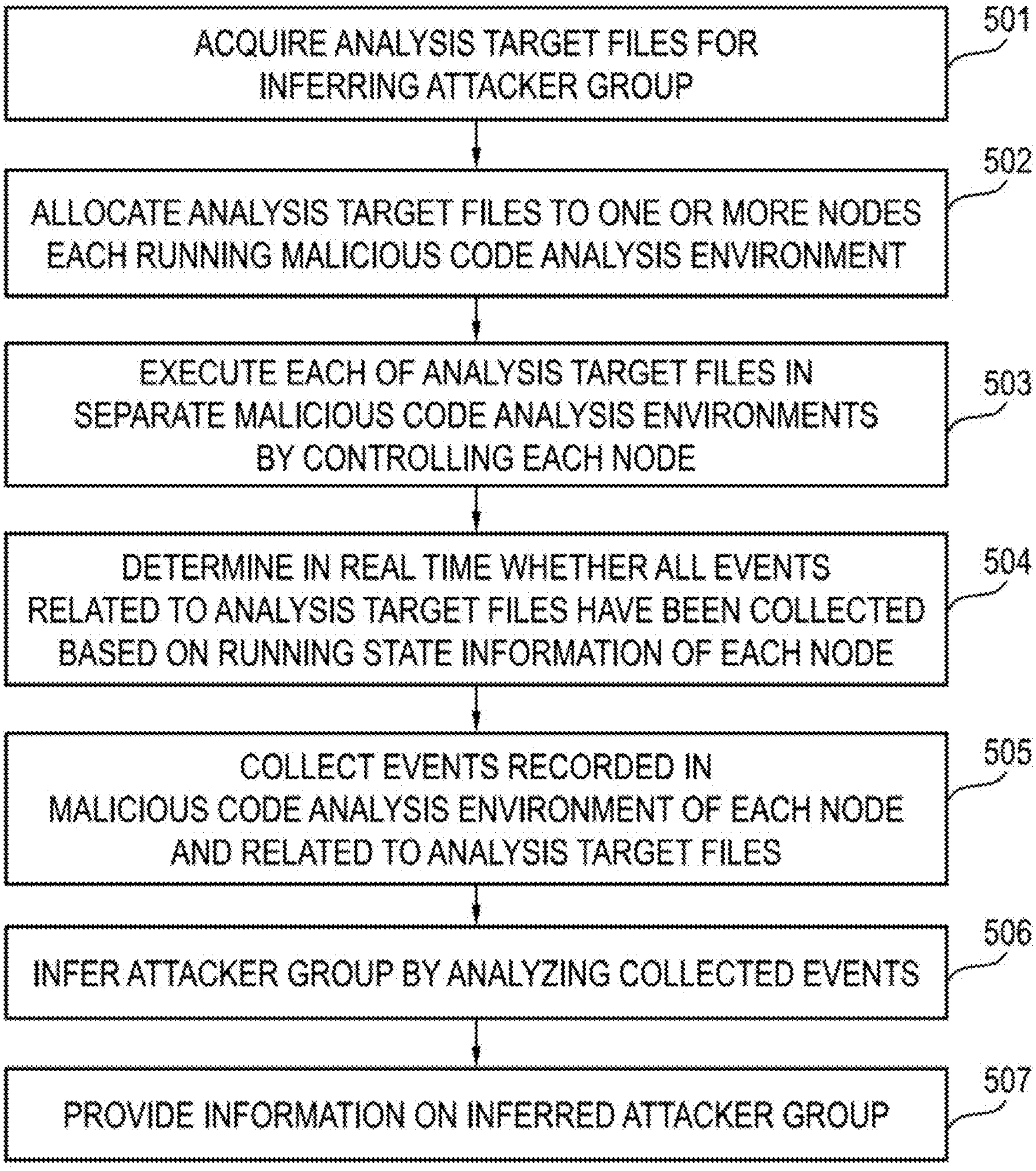
FIG. 5 is a flowchart illustrating a process in which a system according to exemplary embodiments infers an attacker group.

FIG. 5 is a flowchart illustrating a process in which a system according to exemplary embodiments infers an attacker group.

Some or all operations shown in FIG. 5 may be performed by the system according to the exemplary embodiments described in FIGS. 1 to 4. Referring to FIG. 5, in a method of inferring an attacker group according to exemplary embodiments (hereinafter, "method according to exemplary embodiments"), analysis target files for inferring an attacker group may be acquired first (501). Subsequently, in the method according to exemplary embodiments, the analysis target files are allocated to one or more nodes, and each of the nodes runs a malicious code analysis environment (502). Subsequently, in the method according to exemplary embodiments, each of the nodes is controlled to execute the analysis target files in separate malicious code analysis environments (503). Subsequently, in the method according to exemplary embodiments, it may be determined in real time whether all events related to the analysis target files have been collected on the basis of running state information of each of the nodes (504). Also, in the method according to exemplary embodiments, events which are recorded in the malicious code analysis environments of each of the nodes and related to the analysis target files may be collected (505). Subsequently, in the method according to exemplary embodiments, an attacker group may be inferred by analyzing the collected events (506). Finally, in the method according to exemplary embodiments, information on the inferred attacker group is provided (507).

In operation 506 of the method according to exemplary embodiments, the attacker group may be inferred on the basis of similarity information that is derived by comparing the collected events with each of the plurality of sigma rules. The sigma rules may represent one or more attack patterns that defined in advance, the one or more attack patterns may be data consisting of a combination of the order of process generation events, the order of file creation or removal, and information on an action chain.

In operations 502 to 504 of the method according to exemplary embodiments, a file group including one or more files dependent on each other among the analysis target files may be allocated to a first node, the first node may be controlled to execute the one or more files in a first malicious code analysis environment implemented in the first node, and events that are recorded in the first malicious code analysis environment and collected by a system monitoring part run by the first node may be collected. In other words, in operations 502 to 504 of the method according to exemplary embodiments, a first execution file among the analysis target files and one or more dynamic libraries or temporary files that are referred to by the first execution file may be allocated to the first node. Also, instructions executed by the first execution file or logs recorded by the first execution file, events related to one or more registries manipulated by the first execution file, and events including instructions periodically or simultaneously performed by the one or more manipulated registries may all be collected until the running of the first malicious code analysis environment is finished.

In operations 502 to 504 of the method according to exemplary embodiments, on the basis of a scale-out setting of a manager, a plurality of file groups may be allocated to the first node, and the first node may be controlled to simultaneously execute all files in the plurality of file groups. On the other hand, on the basis of the scale-in setting of the manager, only one group may be allocated to one node, or one group may be copied and allocated to each of a plurality of nodes, and the nodes may be controlled to simultaneously execute the group.

The foregoing method according to exemplary embodiments may be implemented as a computer program and performed by the system according to exemplary embodiments or a device thereof.

With this configuration, the system according to exemplary embodiments effectively performs malicious code analysis and attacker group inference.

With this configuration, the system according to exemplary embodiments can accurately identify the cause of a security incident and an attacker group through independent analysis of malicious code and real-time event collection and analysis.

With this configuration, the system according to exemplary embodiments can increase the completeness of a step-by-step automation test of an entire integrated system.

With this configuration, the system according to exemplary embodiments allows analysis of not only direct instructions and damage caused by malicious code but also indirect influence on an entire system and side effects on the entire system.

Figure 6:
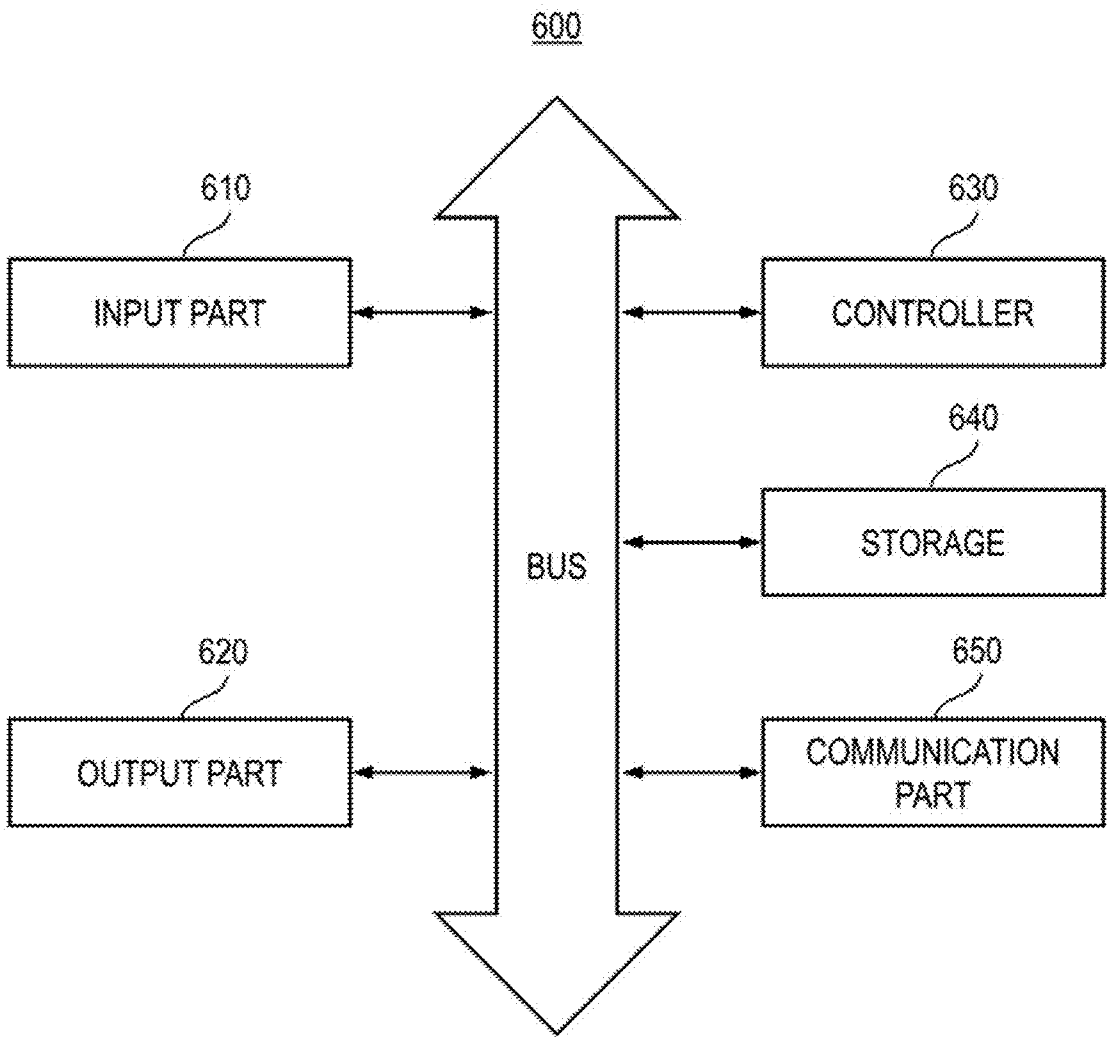
FIG. 6 is a block diagram of a system or server according to exemplary embodiments.

FIG. 6 is a block diagram of a system or server according to exemplary embodiments.

Referring to FIG. 6, a server 600 includes an input part 610, an output part 620, a controller 630, a storage 640, and a communication part 650.

The input part 610 receives instructions or information from a manager. The input part 610 may include one or more of a microphone for receiving audio signals and a key input part.

The output part 620 outputs instruction processing results or various information to the manager. For example, the output part 620 outputs information generated from an automatic malicious code analysis system for inferring an attacker group. To this end, although not shown in the drawing, the output part 620 may include a display, a speaker, a haptic output part, and a light output part. The display may be provided as a flat panel display, a flexible display, an opaque display, a transparent display, or electronic paper (e-paper) or in any form well known in the technical field to which the present disclosure pertains. A touchpad may be stacked on the display to constitute a touchscreen, and a touch key may be implemented through this touchscreen. In addition to the display and speaker, the output part 620 may further include any form of output device well known in the technical field to which the present disclosure pertains.

The controller 630 connects and controls components in the server 600. As an example, the controller 630 controls each of the components such that information generated by the automatic malicious code analysis system for inferring an attacker group may be output through the output part 620. As another example, when judgment information is input by the manager, the controller 630 generates a response signal including the judgment information. The controller 630 may include a central processing unit (CPU), a microprocessor unit (MPU), a microcontroller unit (MCU), a graphics processing unit (GPU), or any form of processor well known in the technical field of the present disclosure.

The storage 640 stores data, programs, applications, and the like required for the server 600 to operate. The storage 640 may include a non-volatile memory, a volatile memory, a hard disk, an optical disc, a magneto-optical disk, or any form of computer-readable recording medium well known in the technical field to which the present disclosure pertains.

The communication part 650 communicates with the automatic malicious code analysis system or other systems for inferring an attacker group via a wired or wireless network.

With this configuration, a system according to exemplary embodiments effectively performs malicious code analysis and attacker group inference. In other words, a system with this configuration according to exemplary embodiments can collect and analyze all processes and system global events related to an analysis target file on only one analysis request, allowing derivation of organic analysis results of a security incident.

With this configuration, a system according to exemplary embodiments allows rapid identification of IOCs for a cyberattack and allows rapid identification of an attacker group (e.g., a hacking organization or the like) for the cyberattack to support initial measures and facilitate post management against an attack.

With this configuration, a system according to exemplary embodiments can accurately identify the cause of a security incident and an attacker group through independent analysis of malicious code and real-time event collection and analysis.

With this configuration, a system according to exemplary embodiments can dynamically increase analysis target nodes during the running of the system, improving scalability and availability of security incident analysis.

With this configuration, a system according to exemplary embodiments can increase the completeness of a step-by-step automation test of an entire integrated system.

With this configuration, a system according to exemplary embodiments allows analysis of not only direct instructions and damage caused by malicious code but also indirect influence on an entire system and side effects on the entire system.

Effects of the present disclosure are not limited to those described above, and other effects which have not been described above will be clearly understood by those skilled in the technical field to which the present disclosure pertains from this specification and the accompanying drawings.

The exemplary embodiments of the present disclosure disclosed in this specification and drawings only propose specific examples to facilitate description of the present disclosure and aid in understanding of the present disclosure and are not intended to limit the scope of the present disclosure. It is self-evident to those of ordinary skill in the art to which the present disclosure pertains that modified examples based on the technical scope of the present disclosure can be made in addition to the exemplary embodiments disclosed herein.

Although the present disclosure has been described above with reference to exemplary embodiments, those skilled in the art should understand that various modifications and variations can be made without departing from the spirit and scope of the present disclosure stated in the following claims.

What is claimed is:

1. A method of inferring an attacker group by analyzing malicious code, the method comprising:

acquiring analysis target files for inferring the attacker group;

allocating the analysis target files to one or more nodes;

controlling the one or more nodes to separately execute the analysis target files in one or more malicious code analysis environments implemented in each of the nodes;

monitoring state information of the one or more malicious code analysis environments by using an event message bus, wherein the state information comprises a pending state (Pending), a running state (Running), a completed state (Completed), and a reported state (Reported) in which events and logs recorded in a malicious code analysis environment are transmitted to an event storage after running of the malicious code analysis environment is completed;

recording events and logs occurring in the one or more malicious code analysis environments;

transmitting events and logs related to the analysis target files to the event storage based on the state information of the one or more malicious code analysis environments being in the completed state;

receiving the state information from the event message bus in real time;

determining in real time whether all the events and the logs related to the analysis target files have been collected in the event storage based on the state information;

when all the events and the logs related to the analysis target files have been collected in the event storage, inferring the attacker group by analyzing the collected events and logs; and providing information on the inferred attacker group to a user.

2. The method of claim 1, wherein the inferring of the attacker group comprises inferring the attacker group using an artificial intelligence model that receives the collected events and logs, the artificial intelligence model is a neural network model that is trained using a plurality of sigma rules stored in a sigma rule storage as training data, and the plurality of sigma rules represent patterns of attack events of each of attacker groups.

3. The method of claim 2, wherein the inferring of the attacker group comprises inferring the attacker group based on similarity information derived by comparing the collected events with each of the plurality of sigma rules.

4. The method of claim 2, wherein the sigma rules comprise one or more predefined attack patterns, and the one or more predefined attack patterns are data consisting of a combination of an order of process generation events, an order of file creation or removal, and information on an action chain.

5. The method of claim 1, wherein the controlling of the one or more nodes comprises:

allocating a file group including one or more files dependent on each other among the analysis target files to a first node; and controlling the first node to execute the one or more files in a first malicious code analysis environment implemented in the first node.

6. The method of claim 5, wherein the allocating of the file group comprises allocating a first execution file among the analysis target files and one or more dynamic libraries or temporary files that are referred to by the first execution file to the first node.

7. The method of claim 6, wherein the recording of the events and the logs comprises recording events including instructions executed by the first execution file or logs recorded by the first execution file, events related to one or more registries manipulated by the first execution file, and instructions periodically or simultaneously performed by the one or more manipulated registries until running of the first malicious code analysis environment is finished.

8. The method of claim 5, wherein the controlling of the one or more nodes comprises, based on a manager's scale-out setting, allocating a plurality of file groups to the first node and controlling the first node to simultaneously execute all files in the plurality of file groups.

9. A device for inferring an attacker group by analyzing malicious code, the device comprising:

a processor; and a memory storing computer-readable instructions, wherein the processor is configured to execute the instructions to:

acquire analysis target files for inferring the attacker group;

allocate the analysis target files to one or more nodes, control the one or more nodes to separately execute the analysis target files in one or more malicious code analysis environments implemented in each of the nodes, monitor state information of the one or more malicious code analysis environments by using an event message bus, wherein the state information comprises a pending state (Pending), a running state (Running), a completed state (Completed), and a reported state (Reported) in which events and logs recorded in a malicious code analysis environment are transmitted to an event storage after running of the malicious code analysis environment is completed, record events and logs occurring in the one or more malicious code analysis environments, transmit events and logs related to the analysis target files to the event storage based on the state information of the one or more malicious code analysis environments being in the completed state, receive the state information from the event message bus in real time, determine in real time whether all the events and the logs related to the analysis target files have been collected in the event storage based on the state information, infer the attacker group by analyzing the collected events and logs when all the events and the logs related to the analysis target files have been collected in the event storage, and provide information on the inferred attacker group to a user.

10. A non-transitory computer-readable recording medium storing a computer program to perform, in combination with a computing device, a method of inferring an attacker group by analyzing malicious code, wherein the method comprises:

acquiring analysis target files for inferring the attacker group;

allocating the analysis target files to one or more nodes;

controlling the one or more nodes to separately execute the analysis target files in one or more malicious code analysis environments implemented in each of the nodes;

monitoring state information of the one or more malicious code analysis environments by using an event message bus, wherein the state information comprises a pending state (Pending), a running state (Running), a completed state (Completed), and a reported state (Reported) in which events and logs recorded in a malicious code analysis environment are transmitted to an event storage after running of the malicious code analysis environment is completed;

recording events and logs occurring in the one or more malicious code analysis environments;

transmitting events and logs related to the analysis target files to the event storage based on the state information of the one or more malicious code analysis environments being in the completed state;

receiving the state information from the event message bus in real time;

determining in real time whether all the events and the logs related to the analysis target files have been collected in the event storage based on the state information;

when all the events and the logs related to the analysis target files have been collected in the event storage, inferring an attacker group by analyzing the collected events and logs; and providing information on the inferred attacker group to a user.

* * * * *